United States Patent [19]
Gupta

[11] Patent Number: 6,072,502
[45] Date of Patent: Jun. 6, 2000

[54] CHARACTERIZATION OF CORNERS OF CURVILINEAR SEGMENT

[75] Inventor: Naresh C. Gupta, Santa Clara, Calif.

[73] Assignee: Adobe Systems Incorporated, San Jose, Calif.

[21] Appl. No.: 08/882,695

[22] Filed: Jun. 25, 1997

[51] Int. Cl.[7] ................................................. G06T 11/20
[52] U.S. Cl. ............................................................. 345/442
[58] Field of Search ................................... 345/442, 441, 345/443

[56] References Cited

U.S. PATENT DOCUMENTS 5,594,852  1/1997  Tankelevich .................... 345/442 X
5,611,036  3/1997  Berend et al. ...................... 345/441

OTHER PUBLICATIONS

A. Blake et al., "Weak Continuity Constraints Generate Uniform Scale–Space Descriptions of Plane Curves", Scotland.

A. Blake, et al., Weak Continuity Constraints Generate Uniform Scale–Space Descriptions of Plane Curves (date unavailable).

Richard L. Burden, et al., *Numerical Analysis*, Second Edition, Chapter 9 (Numerical Solutions of Nonlinear Systems of Equations), 1981, pp. 439–461.

*Primary Examiner*—Mark R. Powell
*Assistant Examiner*—Chanté E. Harrison
*Attorney, Agent, or Firm*—Fish & Richardson P.C.

[57] ABSTRACT

A system determines discontinuities on a drawn curve. Local tangent values for a curvilinear segment are generated by determining the most likely tangent value for all points on the segment and by acting on a sampling of points around the current point whose tangent is to be determined. A robust statistical estimator is then applied to all angle values generated for the sample set to determine the likely intended tangent direction of the current focal point. The system then selects points with significant changes in tangent values to determine curve discontinuities such that the corners of the segment can be derived.

23 Claims, 3 Drawing Sheets

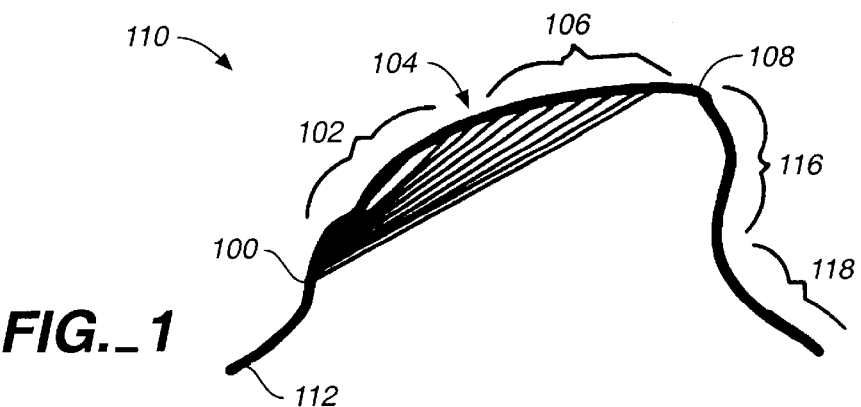
FIG._1
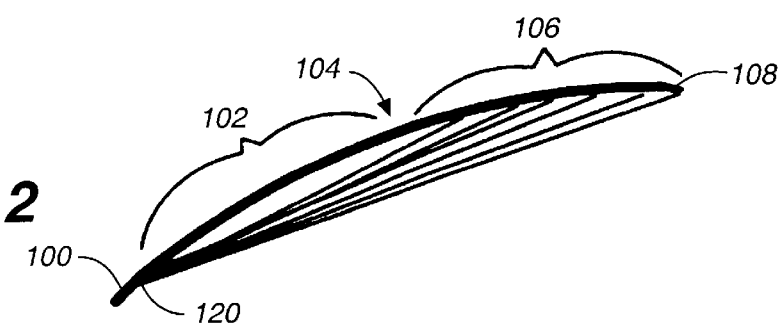
FIG._2
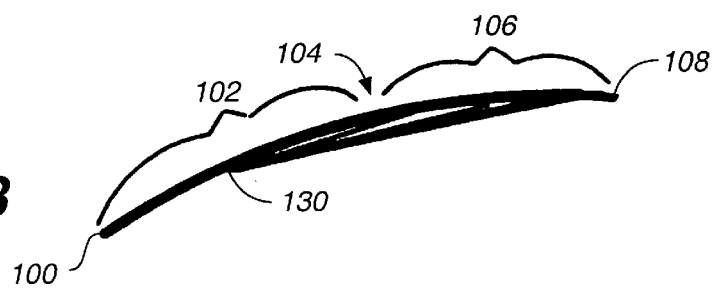
FIG._3
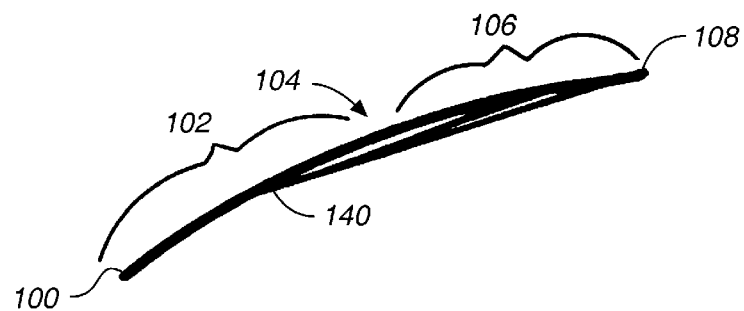
FIG._4

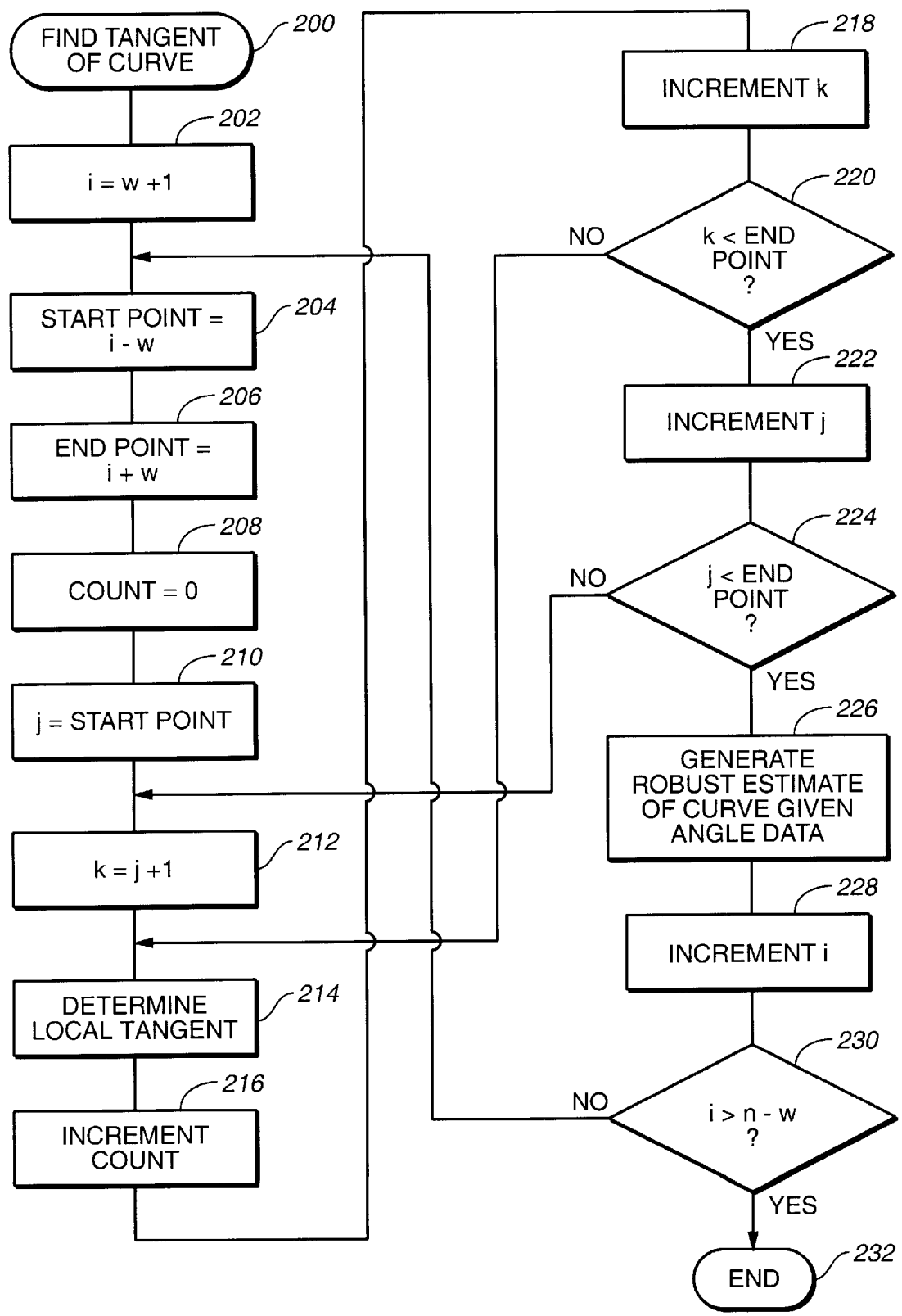
FIG._5

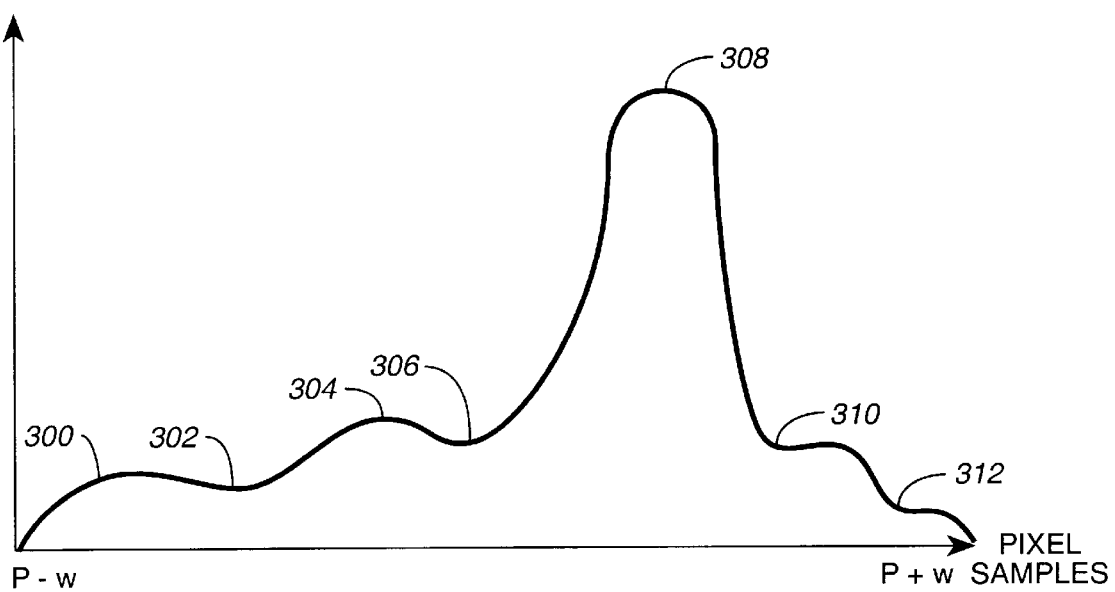
FIG._6
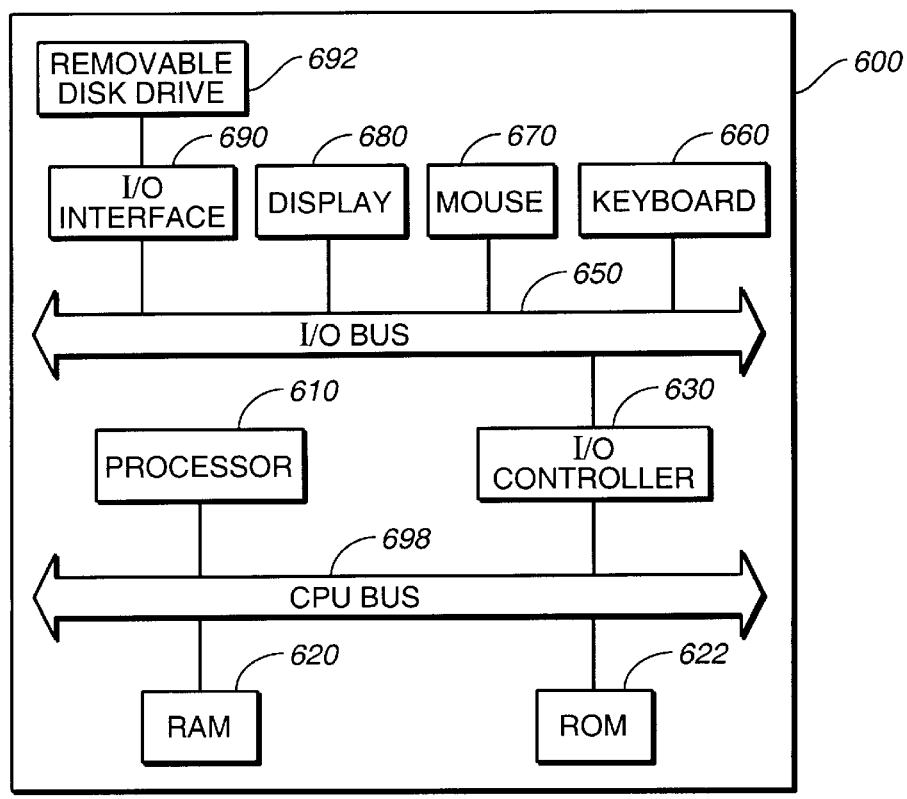
FIG._7

CHARACTERIZATION OF CORNERS OF CURVILINEAR SEGMENT

BACKGROUND

This invention relates to apparatus and methods for characterizing drawn segments, and particularly, to apparatus and methods for characterizing jagged segments.

An important class of computer programs includes computer aided design (CAD) tools and graphics illustration software. To create a drawing using a CAD layout or a graphics design software, users typically select one or more objects and place each object on a drawing sheet displayed by the software on a monitor or other suitable display device. Users can also edit and manipulate these objects to achieve the desired appearance. Application software normally supplies common symbols or objects such as squares, rectangles, circles, and ovals, among others, for the user to select and manipulate in creating at the design. Further, the software also typically provides tools to assist the user in drafting straight lines and curvilinear segments on the digital drawing.

The process of placing and editing the line or curve is generally a trial and error process, especially when the curve is made up of a number of corners or segments. Such attempts at drawing curves with multiple corners or segments generally result in a curve which looks noisy, the noise manifesting itself as a sequence of jagged curves, each of which is defined by begin and end points. The noise in the curve can be eliminated by suitable smoothing operations on the curve. However, such smoothing without regards to the corners of the drawn curve can distort the shape of the curve. These distortions include rounding of the corners and can be easily perceived by human observers.

To characterize the segment, the corners between segments and other objects need to be identified from the jagged, noisy curve. In conventional methods, the drawn segment is converted to a tangent angle/arc length form and filtered to detect corners and curvature discontinuities. One method for detecting corners is a step discontinuity method in which a linear filter is applied to the drawn segment and local tangent angles are determined for each point defining the segment. The rate of change of the local tangent values is also determined. When the angular change along the segment exceeds a predetermined threshold, a new corner is noted and the corner of the segment is established. The step discontinuity method is described in A. Blake, A. Zisserman, and A. V. Papoulias, "Weak continuity constraints generate uniform scale-space descriptions of plane curves," Proceedings of European Conference on Artificial Intelligence (ECAI), Brighton- England, pp. 518–528 (1986). Other systems for detecting discontinuities include systems that use regression to fit step-shaped templates to locally intensify the data, or alternatively, use regression globally across the data.

In characterizing the begin and end points of the segment, the determination of the local tangent angle for each point on the segment is quite important. If the determination of the local tangent angle between points is inaccurate or inconsistent, as may be the result of a noisily drawn segment in place of the intended smooth segment, the determination of corners of the curve or curvilinear segment may also be adversely affected.

SUMMARY

In general, the invention features a computer-implemented apparatus and method for determining end points of a drawn segment by determining the local tangent value for each point on the segment. A focal point is selected for the segment, and the local tangent angle for points within a predetermined window of the focal point is calculated. A robust statistical estimator analyzes local tangent angle values generated for the focal point and determines the most likely intended tangent direction for the focal point. After determining the tangent value of the current point, the next point along the drawn segment becomes the new point to be tested and the tangent evaluation process of the present invention is repeated. This process continues until all points on the curve have been tested.

Next, curve discontinuities are detected by the present invention by determining points with significant changes in the local tangent angle. When the change in the local tangent angle along the drawn segment surpasses a predetermined threshold, a new corner is noted and the edge of the new corner is established.

Among the advantages of the invention are one or more of the following. The apparatus and method of the present invention accurately localizes corners in the curve. This is especially significant in handling highly noisy input which, if noise is to be effectively suppressed, calls for the use of large filters whose parameters are set to clamp down the noise. The use of large filters is undesirable as such filters can make significant errors, including the rounding of corners, disconnection of T-junctions, and displacements of points on the line or curvilinear segment. Further, the local tangent determination process of the present invention is tolerant to noise, as the local tangent generation is insensitive to local perturbations and to outliers, or points that deviate significantly from other points on the curve. Moreover, for noise free data, the process of the present invention produces correct local tangent angles and thus sharply localizes corners. Thus, the present invention supports an accurate determination of begin and end points interior to the drawn stroke.

Other features and advantages of the invention will become apparent from the following description and from the claims.

BRIEF DESCRIPTION OF THE DRAWINGS

FIG. 1 illustrates a drawn segment upon which the process for determining the local tangent direction of a segment.

FIGS. 2, 3 and 4 illustrate the operational progress of the local tangent determining process on the segment of FIG. 1.

FIG. 5 is a flow chart of the process for determining the segment using the local tangent direction determining process.

FIG. 6 illustrates the result generated by the local tangent direction determination process.

FIG. 7 illustrates a computer system of an embodiment of the invention.

DETAILED DESCRIPTION

FIG. 1 shows a drawn segment 112 annotated with information to illustrate the operation of a system that determines a local tangent angle associated with each point on the drawn segment 112. In FIG. 1, the drawn segment 112 is a composite of one or more sub-segments 110, 116 and 118, each of which is defined by points which are analyzed below.

The segment 110 is defined by a start point 100 and an end point 108 which are determined using the processes discussed below. A number of points are located at coordinates $X_j$ and $Y_j$ between the start point 100 and end point 108. A focal point $P_k$ 104 is a point whose tangent value $T_k$ is to be generated. A number of points on the drawn segment 112 within ±w points of the $P_k$ point 104 are utilized to arrive at the tangent value $T_k$. Thus, FIG. 1 illustrates a group 102 of w points before the $P_k$ point 104 and a group 106 of w points after the $P_k$ point 104 forming a window having 2w+1 points with the $P_k$ point 104 in the middle of the window.

Within the window defined by ±w, the local tangent value for each point therein is determined in a pairwise manner with respect to the focal point $P_k$. A robust estimator determines the most likely local tangent value for the focal point based on a predetermined process, as discussed below. After the local tangent value has been determined for the current focal point, the next focal point is selected and the analysis is repeated until the local tangent values for all points on the segment have been analyzed. The selection of subsequent focal points may be accomplished in a number of ways, including the selection of points in the order entered by the user in the event that the segment is sketched by the user. Alternatively, in the event that the drawn curve is optically captured and digitized, the points may be selected using a predetermined heuristics approach such as selecting points in an increasing order on the x-axis.

FIGS. 2, 3 and 4 illustrate the sequencing of the process for determining the local tangent value $T_k$ of the focal point $P_k$ 104. From an initial point i, the next starting points can be selected. In FIG. 2, the next starting point, or point (i+1), is shown as point 120, located at coordinate $X_{i+1}, Y_{i+1}$. The computation of the local tangent value is performed from the point 120 to the point 108, as discussed in more detail below. Similarly, in FIGS. 3 and 4, the next starting points are point 130, located at coordinate $X_{i+2}, Y_{i+2}$, and point 140, located at coordinate $X_{i+3}, Y_{i+3}$. Further, as illustrated in FIGS. 2–4, each subsequent adjacent point, in a predetermined order, is analyzed for its local tangent angle from the starting points 120, 130 and 140 respectively. This process is repeated until the next starting point reaches the end point 10 on the drawn segment 112. After the local tangent values have been generated, the robust estimator determines the most likely tangent value for the focal point $P_k$ by applying a predetermined criterion such as a statistical mode of all the local tangent values determined thus far, as discussed below.

FIG. 5 is a flow chart of a method 200 for determining the local tangent direction of points along a drawn segment. At step 202, the method sets an index variable i, which represents the current focal point, to a value of w+1,where w is the width of the window. At step 204, the routine sets the start point to i−w. Next, the routine sets the end point to i+w (step 206). A counter variable count is initialized to zero (step 208) and an index variable j is initialized to the value of the start point (step 210).

At step 212, the method sets an index variable k to j+1. The method then determines the slope of the line connecting point j to point k which is determined using the following formula:

$$A_{jk} = arctan\,((Y_k - Y_j)/(X_k - X_j))$$

where k>j.

The routine then increments the count value (step 216). Next, it also increments the k value (step 218). The routine checks whether all points up to the end point have been evaluated (step 220). If not, the routine loops from step 220 back to step 214 to continue processing data for the current group of points.

Alternatively, in the event that k exceeds the end point in step 220, the routine increments j to point to the next starting point (step 222). The routine further checks whether j is pointing past the end point (step 224). If not, the routine loops back to step 212 where it continues the processing of tangent point determination for all points appearing after the j-th point.

Alternatively, in the event that j exceeds the end point (step 224), the routine generates a robust estimate of the segment given the local tangent data (step 226). The routine may compute the mean, the mode, the median, or any other suitable robust estimate of the local tangent angle data. The estimate methodology is advantageously the mode of the data. The value generated by the maximized mode becomes the tangent direction value for the focal point. In using the mode estimation of the segment 112, appropriate calculations are performed to prevent angle wrapping issues at around $2*\pi$ (step 226) such that for an angle exceeding $2*\pi$, the appropriate multiples of $2*\pi$ are subtracted from the angle to arrive at an angular value which is less than $2*\pi$.

The routine then increments the index variable i (step 228). Next, the routine checks whether the variable i has exceeded the value of n−w (step 230). If not, the routine loops back from step 230 to step 204 to continue the local tangent determination process for each point on the segment. Alternatively, in step 230, in the event that i has exceeded the n−w limit, the routine exits (step 232).

Thus, within the window of ±w points around a focal point $P_k$, the method identifies a starting point. The local tangent value for each subsequent adjacent point (in the positive direction) is calculated from the starting point. After each of the subsequent point has been processed, the point with the next lowest value coordinates within the current window becomes the next starting point and the angle determination process is repeated for each subsequent adjacent point in the positive direction. For boundary points of the curve (points with i<w and i>n−w), the window size w is appropriately reduced to include only the points on the curve.

Next, the robust statistical estimate is applied to all angle values generated within the defined window. The robust statistical estimator determines the user's likely intended tangent direction of the current focal point. After assigning the tangent value to the focal point, the next point along the segment becomes the focal point to be analyzed and the tangent evaluation process is repeated until all points have been evaluated.

After the tangent direction values for all points have been generated, a process to determine the segment discontinuities is performed and the corners of the segment are established. In this manner, the drawn segment can be compactly represented with information relating to the position of corners, junctions and curvilinear line endings.

The method 200 can be implemented using a variety of computer languages. A representative implementation using a pseudo-code based on the language C is shown below.

```
Compute_Digital_Curve_Tangent (    double X[],
                                    double Y[],
                                    int n,
                                    double th[]   )
        int i, j, k, start_point, end_point, count;
        double th_arr[(2*w + 1)^2];
For each data point i, starting from w + 1 to n − w do
{
start_point = i − w;
end_point = i + w;
count = 0;
```

-continued

```
for (j = start_point; j <= end_point; j++)
    for (k = j + 1; k <=end_point; k++) {
        th_arr[count] =arc_tan2(Y[k] - Y[j], X[k] - X[j]);
        count++;
    }
    th[i] = robust_estimate_angle ( th_arr, count);
}
``` where th_arr is an array for storing the local tangent values of all points; and
where the function arc_tan2 (y, x) is commonly implemented as atan2 in the math library of computer system. This function computes the arc-tangent (in range 0 to $2*\pi$) given X and Y coordinates.

With reference to the above pseudo-code, from the set of data points (X[i], Y[i]) representing the segment in 2-D coordinate space where the data points are corrupted by random noise due to discretization and other process noise, the method robustly computes the local tangent angle (th[i]) at each focal point i. As discussed below, changes in tangent value for the focal points are analyzed, and discontinuities are noted in regions with sharp changes in focal point tangent values.

FIG. 6 illustrates the results generated by the method 200 (FIG. 5). The plot of local tangent values for the focal points shows a plurality of peak and trough points 300, 302, 304, 306, 308, 310 and 312. The peaks and trough points 302–306 are close to each other. This indicates that points associated with these local tangent values are on the same curvilinear segment. Similarly, peaks and troughs 310–312 are close in value, indicating that the points they represent are a part of another curvilinear segment. However, when the change in local tangent angle becomes significant, as represented by the differences between points 306 and 308 and points 308 and 310, the method marks the point 308 as a new corner. From the plot of FIG. 6, the change or first derivative of the generated local tangent values for points along the drawn segment is analyzed to characterize the begin and end points of the drawn segment.

The invention may be implemented in digital hardware or computer software, or a combination of both. Preferably, the invention is implemented in a computer program executing in a computer system. Such a computer system may include a processor, a data storage system, at least one input device, and an output device. FIG. 7 illustrates one such computer system 600, including a processor (CPU) 610, a RAM 620, a ROM 622 and an I/O controller 630 coupled by a CPU bus 698. The I/O controller 630 is also coupled by an I/O bus 650 to input devices such as a keyboard 660, a mouse 670, and output devices such as a monitor 680. Additionally, one or more data storage devices 692 is connected to the I/O bus via an I/O interface 690.

Further, variations to the basic computer system of FIG. 7 are within the scope of the present invention. For example, instead of using a mouse as user input devices, a pressure-sensitive pen, digitizer or tablet may be used to generate the drawn segment location information. The user input is thus sampled to define the segment.

Other embodiments are within the scope of the following claims. For instance, the methods of the present invention can also be applied to data fitting applications where significant outliers and noise may be present in the data to be fitted. In this process, a focal data point is selected for a group of data to be fitted with a straight line model. In this process, the tangent value for lines connecting every two pairs of data points is obtained. A robust estimate of these tangent values provides the slope of the line to be fitted. The intercept of the line can be estimated using a robust estimator to the set of intercepts generated from each individual input points using the previously estimated slope of the line.

Further, in place of a graphical user interface (GUI) for entering points of the drawn segment, a scanner or facsimile receiver may be connected to the processor to receive or capture a raster image containing the curvilinear segment to be characterized. The objects contained in the raster image are identified and extracted using a suitable image processing routine. Once the noisy curvilinear segments have been identified, the present techniques can be applied to determine the begin and end points for the segments. In this embodiment, a focal pixel is selected for the segment, and the local tangent angle for pixels within a predetermined window of the focal pixel is calculated. The robust statistical estimator then analyzes local tangent angle values generated for the focal pixel and determines the most likely intended tangent direction for the focal pixel. After determining the tangent value of the current pixel, the next pixel along the drawn segment becomes the new pixel to be tested and the tangent evaluation process of the present invention is repeated. The discontinuities along the curve are subsequently identified by examining the changes along the generated local tangent values. By using the information relating to the thus characterized begin and end points of the curvilinear segment, the quality of the raster image can be enhanced.

What is claimed is:

1. A computer-implemented method for characterizing data points in a two-dimensional space, comprising:
    selecting a sequence of focal points from the data points and for each focal point calculating a local tangent value by:
        selecting for the focal point a neighborhood of data points including the focal point,
        selecting multiple pairs of points from among the points in the neighborhood and for each pair of points, calculating a component tangent value defined by the slope of a line defined by the pair of points, thereby calculating multiple component tangent values for the focal point,
    estimating a local tangent value at the focal point based on the component tangents calculated for the neighborhood of the focal point.

2. The method of claim 1, wherein the data points are defined by a drawn curve, the drawn curve defining a sequence order for the data points.

3. The method of claim 1, wherein the component tangent value from point j to point k in the neighborhood is calculated in accordance with the expression:

$$\arctan ((Y_k - Y_j)(X_k - X_j))$$

where X and Y are coordinates of points j and k.

4. The method of claim 1, wherein the estimating step generates a mode.

5. The method of claim 1, wherein the estimating step generates a mean.

6. The method of claim 1, wherein the estimating step generates a median.

7. The method of claim 2, further comprising:
    identifying an edge of a corner in the drawn curve where a change in the local tangent angle at focal points along the drawn curve surpasses a predetermined threshold.

8. The method of claim 2, wherein the drawn is generated by a user gesture.

9. A memory device storing computer-readable instructions for aiding a computer to characterize a drawn segment defined by a plurality of points on a two-dimensional space, comprising instructions for:

selecting a focal point, the focal point having a local tangent value;

determining a plurality of tangent values around the focal point by forming a line between selected ones of the plurality of points that is spaced within a determined window of the focal point;

determining the local tangent value from the plurality of tangent values; and determining likely transition points on the segment based on changes in the local tangent values of the focal points.

10. The memory device of claim 9, wherein the drawn segment is a curve.

11. The memory device of claim 9, wherein the component tangent value from point j to point k in the neighborhood is calculated in accordance with the expression:

$$\arctan((Y_k-Y_j)/(X_k-X_j))$$

where X and Y are coordinates of points j and k.

12. The memory device of claim 9, wherein the estimating instruction generates a mode.

13. The memory device of claim 9, wherein the estimating instruction generates a median.

14. The memory device of claim 9, wherein the estimating instruction generates a mean.

15. The memory device of claim 9, wherein the transition point identifying instruction determines the edge of a corner of the segment.

16. The memory device of claim 9, wherein the input sampling instruction samples user gestures.

17. A computer system for characterizing a drawn segment defined by a sequence of points on a two-dimensional space, comprising:

a display;

a user input device for receiving user input; and a processor with instructions for:

selecting a sequence of focal points from the data points and for each focal point calculating a local tangent value by:

selecting for the focal point a neighborhood of data points including the focal point, selecting multiple pairs of points from among the points in the neighborhood and for each pair of points, calculating a component tangent value defined by the slope of a line defined by the pair of points, thereby calculating multiple component target values for the focal point, estimating a local tangent value at the focal point based on the component tangents calculated for the neighborhood of the focal point.

18. The computer system of claim 17, wherein the drawn segment is a curve.

19. The computer system of claim 18, wherein the estimating instruction generates a maximized mode.

20. The computer system of claim 18, wherein the component tangent value between points I and j is generated using the formula:

$$\arctan((Y_k-Y_j)/(X_k-X_j))$$

where X and Y are coordinates of points j and k.

21. The method of claim 1, further comprising generating a tangent curve from the local tangent values calculated at the focal points in the sequence of focal points.

22. The method of claim 1, further comprising using the local tangent values to identify any corner points among the focal points.

23. The method of claim 2, further comprising using the local tangent values to identify any corner points among the focal points.

* * * * *